United States Patent [19]

Wenghoefer et al.

[11] 4,138,395
[45] Feb. 6, 1979

[54] WATER SOLUBLE COPPER COMPLEX MONOAZO DYESTUFF BASED UPON ORTHO-AMINO PHENOL-SULFONIC ACID AND N-ACETOACETYL COMPOUND OF AMINO-BENZENE-β-HYDROXY-ETHYL-SULFONE-SULFURIC ACID ESTER

[75] Inventors: Johann Wenghoefer, East Greenwich; Dennis G. Messier, West Greenwich, both of R.I.

[73] Assignee: American Hoechst Corporation, Bridgewater, N.J.

[21] Appl. No.: 798,495

[22] Filed: May 19, 1977

Related U.S. Application Data

[63] Continuation-in-part of Ser. No. 645,874, Dec. 31, 1975, abandoned.

[51] Int. Cl.$^2$ .............. C09B 45/18; C09B 62/74; D06P 1/38; D06P 3/04
[52] U.S. Cl. ..................... 260/149; 260/458 C
[58] Field of Search .................. 260/149, 193

[56] References Cited

U.S. PATENT DOCUMENTS

| | | | |
|---|---|---|---|
| 3,135,730 | 6/1964 | Heyna et al. | 260/147 |
| 3,417,073 | 12/1968 | Meininger et al. | 260/149 |
| 3,417,074 | 12/1968 | Kuhne et al. | 260/149 |

FOREIGN PATENT DOCUMENTS 1012010 7/1957 Fed. Rep. of Germany .......... 260/149

Primary Examiner—Floyd D. Higel
Attorney, Agent, or Firm—Curtis, Morris & Safford

[57] ABSTRACT

Water soluble, metallized monoazo dyestuffs are shown, which in the form of their free acids correspond to the general formula

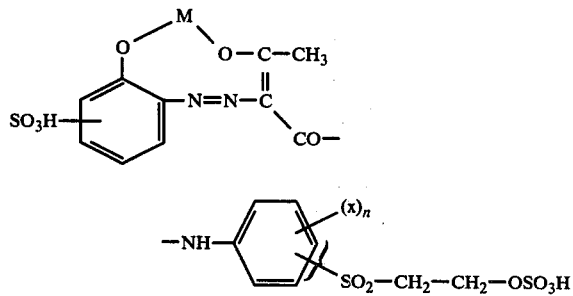

where M is copper or chromium, $x$ is methyl or methoxy and $n$ is 0 or an integer of 1 to 2. The new dyestuffs are useful for dyeing and printing cotton and linen and other fibrous materials and they exhibit good fastness properties to light and wet processing and in addition display excellent build-up properties.

1 Claim, No Drawings

WATER SOLUBLE COPPER COMPLEX MONOAZO DYESTUFF BASED UPON ORTHO-AMINO PHENOL-SULFONIC ACID AND N-ACETOACETYL COMPOUND OF AMINO-BENZENE-β-HYDROXY-ETHYLSUL-FONE-SULFURIC ACID ESTER

This application is a continuation-in-part of application Ser. No. 645,874, filed Dec. 31, 1975, now abandoned.

The present invention relates to new, metallized monoazo dyestuffs, which, in the form of their free acid, correspond to the following general formula

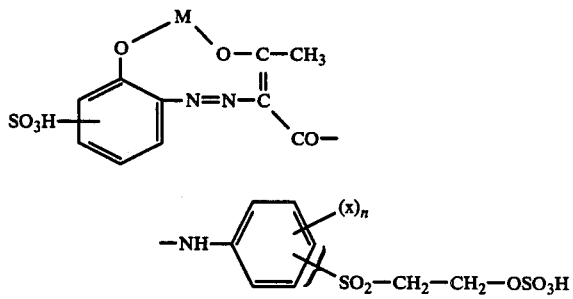

where M is copper or chromium, $x$ is methyl or methoxy and $n$ is 0 or an integer from 1 to 2.

Dyestuffs of the present invention are obtained by coupling diazotized ortho-amino phenol-sulfonic acids on N-aceto acetyl compounds of amino-benzene-beta-hydroxy-ethyl sulfone-sulfuric acid-esters. The resulting monoazo dyestuffs can be converted into the corresponding metal complexes with salts of copper or chromium in neutral to weakly acid water solution, preferably at elevated temperatures.

The N-aceto-acetyl compounds used as coupling components are obtained by reacting amino-benzene-beta-hydroxy-ethyl sulfone-sulfuric acid-esters with diketene in water at temperatures between 20° and 80° C. The following hydroxy ethyl sulfone-esters may be used. 1-amino-benzene-4-beta-hydroxy-ethyl sulfone-sulfuric acid ester, 1-amino-2-methoxy benzene-5-beta-hydroxy-ethyl sulfone-sulfuric acid-ester, 1-amino-2-methoxy-5-methyl benzene-4-beta-hydroxy-ethyl sulfone-sulfuric acid-ester, and 1-amino,2,5-dimethoxy benzene-4-beta-hydroxy-ethyl sulfone-sulfuric acid-ester.

The new dyestuffs can be used for dyeing and printing of various fibrous materials, especially cotton, linen, and viscose rayon, according to known methods for applying fiber-reactive dyestuffs in the presence of agents having an alkaline reaction. They may be further used for dyeing and printing of wool, silk and polyamide fibers from neutral to weakly acid solution. The copper containing compounds yield yellow mustard shades having very good fastness properties to light and wet processing, and because of their excellent build-up and economy these dyestuffs are especially well suited for obtaining deep bottle green shades in mixtures.

The dyestuffs of the invention have properties which make them superior to dyestuffs known in the art. They have excellent solubility characteristics in water and in water containing dissolved salts. The dyestuffs are particularly suitable and reliable for use in exhaust dyeing procedures such as package dyeing because they have excellent reactive properties as compared with prior art dyestuffs. In such procedures they can be mixed with other dyestuffs and the dyeings obtained are level and uniform. Moreover, the color obtained is not a function of the length of time of the exhaust dyeing procedure.

The following examples illustrate the invention. Parts and percentages are by weight unless stated otherwise.

EXAMPLE I 112.4 parts by weight of 1-amino benzene-4-beta-hydroxy-ethyl sulfone-sulfuric acid-ester were stirred into 800 parts by weight of water and neutralized with sodium carbonate to a pH of 6–6.5. Then 37 parts by weight of diketene were added slowly within 2 hours starting at a temperature of 20° C. The temperature was allowed to rise. After the diketene addition was completed the solution was heated to 80° C and agitated for 2 hours.

The N-aceto-acetyl compound was cooled to 20° C and coupled at a pH of 6.5 with a diazo slurry, which had been prepared by diazotizing 75.6 parts by weight of 2-amino phenol-4-sulfonic acid with 80 parts by weight of a 34.8% sodium nitrite solution.

After completion of the coupling the dyestuff was coppered by adding 100 parts by weight of crystallized copper sulfate and 100 parts by weight of crystallized sodium acetate and heating the mixture to 70° C for 2 hours. The dyestuff was then precipitated with potassium chloride, filtered and dried.

The yellow-brown powder is soluble in water and produces strong yellow mustard tints with very good properties on native or regenerated cellulose fibers.

The dyestuff is represented by the following formula

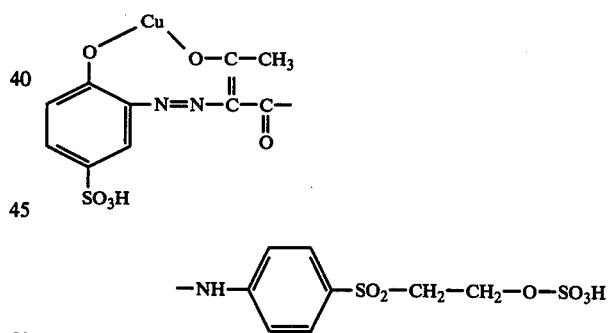

EXAMPLE II 130 parts by weight of 1-amino-2-methoxy-5-methyl benzene-4-beta-hydroxy-ethyl sulfone-sulfuric acid-ester were stirred into 800 parts by weight of water and neutralized with sodium carbonate to a pH of 6–6.5. Then 37 parts by weight of diketene were added slowly within 2 hours starting at a temperature of 20° C. The temperature was allowed to rise. After the diketene addition was completed the solution was heated to 80° C and agitated for 2 hours.

The N-aceto-acetyl compound was cooled to 20° C and coupled with diazotized 2-amino phenol-5-sulfuric acid as described in Example I. The copperized dyestuff represented by the following formula produces mustard yellow shades on cellulosive fibers with excellent fastness properties.

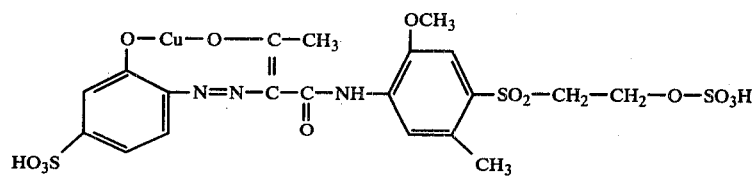

EXAMPLE III 124 parts by weight of 1-amino-2-methoxy-5-beta-hydroxy-ethyl sulfone-sulfuric acid-ester were stirred into 800 parts by weight of water and neutralized with sodium carbonate to a pH of 6–6.5. Then 37 parts by weight of diketene were added slowly within 2 hours starting at a temperature of 20° C. The temperature was allowed to rise. After the diketene addition was completed the solution was heated to 80° C and agitated for 2 hours.

The N-aceto acetyl compound was cooled to 20° C and coupled with diazotized 2-amino phenol-4-sulfuric acid, as described in Example I. The dyestuff was converted into the chromium complex by adding 104 grams of chrom alum and 100 grams of sodium acetate. After heating the mixture to 80° C the dyestuff was precipitated with potassium chloride. The dyestuff, which is represented by the following formula, produces a reddish yellow shade and has excellent fastness properties.

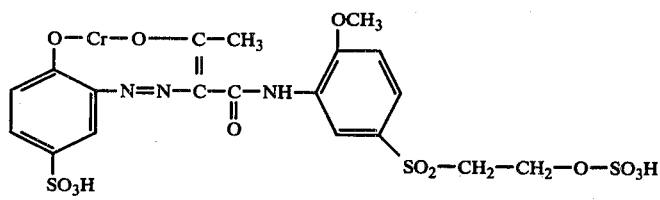

What is claimed is:
1. A monoazo dyestuff of the formula

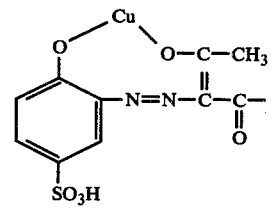

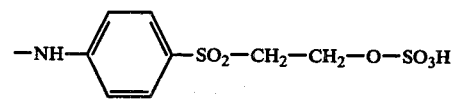

* * * * *

UNITED STATES PATENT AND TRADEMARK OFFICE
CERTIFICATE OF CORRECTION

PATENT NO. : 4,138,395
DATED : February 6, 1979
INVENTOR(S) : WENGHOEFER ET AL.

It is certified that error appears in the above-identified patent and that said Letters Patent are hereby corrected as shown below:

In the Heading, Item [63] and in column 1, lines 10 to 11, after "abandoned," insert --which was a continuation of Ser. No. 460,140 filed April 11, 1974, abandoned --.

Signed and Sealed this

Fifteenth Day of May 1979

[SEAL]

Attest:

RUTH C. MASON
Attesting Officer

DONALD W. BANNER
Commissioner of Patents and Trademarks